April 19, 1960  H. R. BOTT  2,933,444
ELECTRODIALYSIS CELLS

Filed June 28, 1956  2 Sheets-Sheet 1

Inventor
Hugh Randall Bott
By
Bailey, Stephens v Huettig
Attorneys

April 19, 1960 H. R. BOTT 2,933,444
ELECTRODIALYSIS CELLS
Filed June 28, 1956 2 Sheets-Sheet 2

Inventor
Hugh Randall Bott
By
Bailey, Stephens + Huettig
Attorneys

United States Patent Office 2,933,444
Patented Apr. 19, 1960

2,933,444

ELECTRODIALYSIS CELLS

Hugh Randall Bott, London, England, assignor to The Permutit Company Limited, London, England Application June 28, 1956, Serial No. 594,638

Claims priority, application Great Britain July 5, 1955

2 Claims. (Cl. 204—301)

In electrodialysis cells made up of compartments separated by an assembly of membranes, at least every alternate membrane having ion-exchange properties, it is important to make each compartment very narrow and therefore to maintain the membranes very close together. This is desirable in order to reduce the overall electrical resistance between the electrodes as far as possible. It is usual to separate the membranes, which are usually alternately cation- and anion-exchange membranes, from one another by spacers, the whole assembly being held together in a press between end plates. Each spacer is generally in the form of a rectangular framework, the hollow centre of which when assembled between plane membranes forms the compartments through which the electrolytes flow. The spacers are flexible, usually being made of plastic, for example, plasticised polyvinyl chloride or of rubber, because of ease of manufacture.

In order to form a watertight seal between the compartments without having to apply an excessive force to the end plates and, further, to avoid screening an unduly large area of the membrane surface, the width of the framework is made as narrow as possible. I have found, however, that when a large number of spacers and membranes, forming say 100 compartments, is assembled the whole assembly is mechanically unstable and tends to collapse when pressure is applied to the end plates.

It is an object of my invention to provide a novel construction of electrodialysis cell.

It is a further object of my invention to provide a mechanically stable and water-tight electrodialysis cell.

Other objects of my invention will become apparent hereinafter.

According to this invention rigid spacers are inserted in the assembly at intervals to replace flexible spacers and are held in position by rods passing through their peripheries. By assembling a cell in this way I find the tendency to collapse under pressure is much reduced, and moreover, the pressure between the end plates necessary to render the assembly liquid-tight is reduced.

Figure 1:
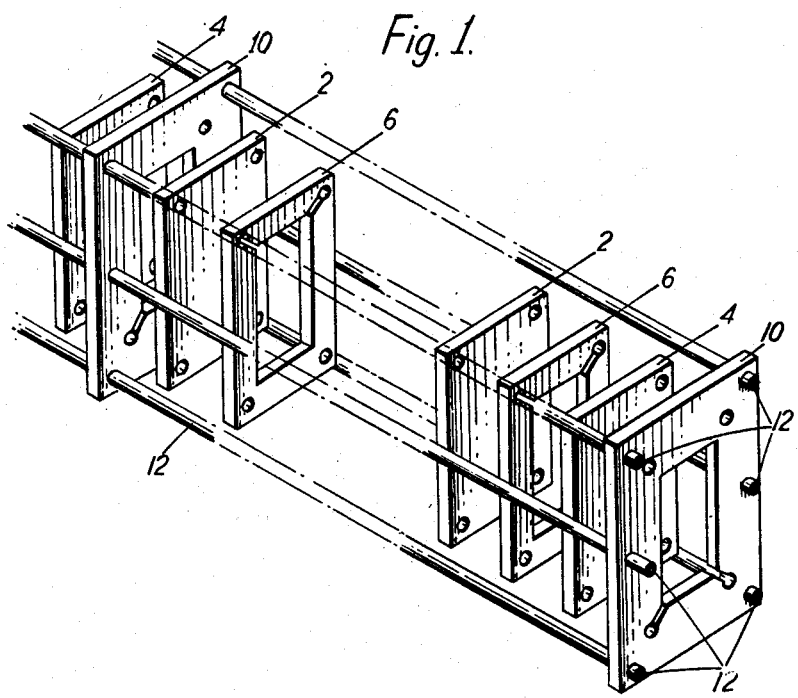
Figure 2:
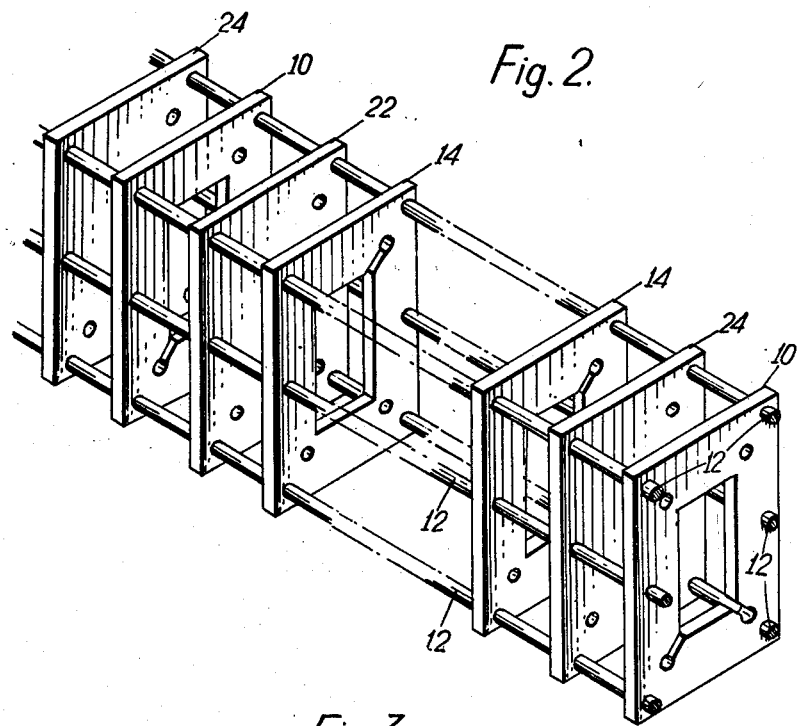
Figure 3:
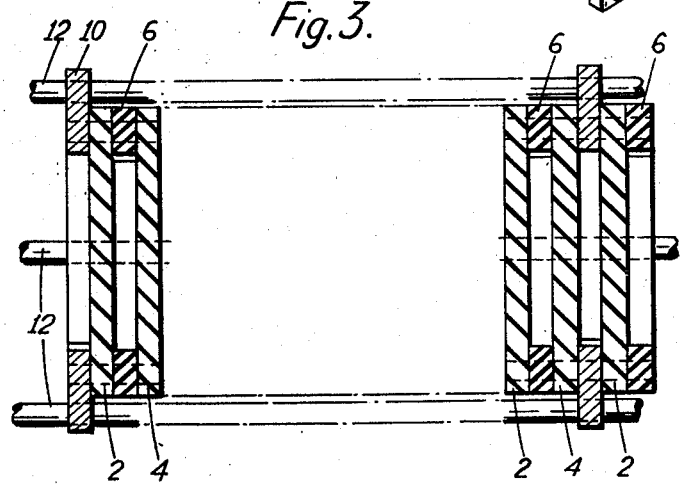

The construction of two cells according to this invention will now be described by way of example and not of limitation with reference to the accompanying drawings in which Figures 1 and 2 are exploded diagrammatic views of part of two cells; and Figure 3 is a longitudinal section through part of a cell similar to that shown in Figure 1.

In each figure the cells are made up of alternate cation-exchange membranes 2 and anion-exchange membranes 4 held apart by spacers. Most of the spacers are flexible, being made of plasticised polyvinyl chloride, but some flexible spacers are replaced at intervals by rigid spacers.

Holes are formed in both membranes and spacers to form four conduits through the cell when the assembly of membranes and spacers is compressed. One pair of conduits introduces one liquid to one set of alternate compartments and removes it from this set and the other pair of conduits serves the other set. The electrodes are not shown in the drawings nor is the means for compressing the assembly of membranes and spacers, although if the rods holding the spacers in position are bolts they can themselves be used for compressing the assembly.

Turning now to Figures 1 and 3 the flexible spacers are indicated by the numeral 6 and the rigid spacers by the numeral 10. The latter are larger than the flexible membranes 6 and have holes in their peripheries outside the cell proper and are held in position by rods 12.

Although a cell constructed in this way is more stable mechanically than one constructed with flexible spacers alone, there is still tendency for the assembly to collapse. This tendency is reduced in the preferred construction shown in Figure 2. In this case all the membranes and spacers are mounted on the rods 12. The cation-exchange membranes are here indicated by the numeral 22 and the anion-exchange membranes by the numeral 24.

The rods in the cell shown in Figure 2 make the cell very stable, but the stability is not entirely due to their presence. In the absence of rigid spacers a higher pressure is needed to make the cell liquid-tight, and there is still a tendency for collapse. To illustrate this we refer to the following experiments.

Two cells were constructed as shown in Figure 2, consisting of 120 ion-exchange membranes having alternately cation- and anion-exchange properties and 121 spacers arranged alternately with them, the whole being set between steel end plates which could be pulled together by bolts and nuts. The two cells were identical except that in one all the spacers were made of plasticised polyvinyl chloride sheet, those making up the compartments bounded by a cation-exchange membrane on the cathode side and by an anion-exchange membrane on the anode side being 1.3 mm. thick and those of the alternate compartments being 3.3 mm. thick. In the other cell every tenth thick spacer, that is every twentieth spacer, was of rigid ebonite 3.3 mm. thick. Each cell was screwed down while water was flowing appropriately through the compartments until less than 1% of the water entering the cells leaked outwards. The distance between the end plates in the cell containing only flexible spacers was 34.1 cm. while that in the cell containing the ebonite spacers was 35.2 cm., indicating a lower applied pressure in the latter cell.

The nuts on the cell containing the ebonite spacers were then screwed down until the distance between the plates was the same as that in the other cell, and the two cells left to stand untouched. After two days the cell containing flexible spacers only was found to have collapsed inwards; the other cell, however, was still intact after twelve weeks. Furthermore, no sign whatever of leakage was now observed from the latter cell.

In general I find it sufficient to replace every twentieth flexible spacer with a rigid spacer, but the intervals between rigid spacers can vary widely, their frequency depending, inter alia, on the material of the flexible spacers, the area of the membranes and the width of the framework. Further, the intervals between the rigid spacers may be even or uneven.

In the constructions shown in the drawings (Figures 1 and 3) the rigid spacers are rectangular and larger than the membranes, and the peripheries are merely the outside edges of the spacers. However, the peripheries of the rigid spacers in the construction shown in Figures 1 and 3 or the peripheries of the rigid spacers, membranes and flexible spacers in the construction shown in Figure 2 can be formed of lugs or tongues projecting from the edges of the spacers and membranes.

It has been proposed to make the flexible spacers integral with the membranes and the same problem of mechanical instability arises here, and can also be alleviated by inserting a plane membrane and a rigid, separate spacer instead of a membrane having an integral, flexible spacer at intervals in the assembly.

The rigid spacers can be made, for example, of rigid, unplasticised polyvinyl chloride or of ebonite. These materials are electrically insulating, but metal spacers can be used provided they are given an electrically insulating coating on each side to prevent shortcircuiting of the cell.

I claim:

1. An electrodialyzing apparatus including an assembly of membranes, spacers separating each of said membranes from one another, some of said spacers being flexible and other spacers being rigid, said flexible spacers and membranes separated thereby being arranged in a series of sets each of which includes several of said spacers and a rigid separator between the sets, and rods passing through the peripheries of the rigid spacers, said assembly providing a multiple chambered container in which the electrodialysis takes place.

2. An electrodialyzing apparatus including an assembly of membranes, spacers separating each of said membranes from one another, some of said spacers being flexible and other spacers being rigid, said flexible spacers and membranes separated thereby being arranged in a series of sets each of which includes several of said spacers and a rigid separator between the sets, and rods passing through the peripheries of all the spacers and membranes, said assembly providing a multiple chambered container in which the electrodialysis takes place.

References Cited in the file of this patent

UNITED STATES PATENTS

| | | |
|---|---|---|
| 1,022,523 | Whitney | Apr. 9, 1912 |
| 1,592,512 | Allan | July 13, 1926 |
| 2,225,024 | Weber | Dec. 17, 1940 |
| 2,594,518 | Teale | Apr. 29, 1952 |
| 2,758,083 | Van Hoek et al. | Aug. 7, 1956 |
| 2,799,644 | Kollsman | July 16, 1957 |
| 2,802,344 | Witherell | Aug. 13, 1957 |

FOREIGN PATENTS

| | | |
|---|---|---|
| 551,864 | Germany | June 6, 1932 |
| 827,350 | Germany | Jan. 10, 1952 |

OTHER REFERENCES

Horner et al.: Ind and Eng. Chem., vol. 47, No. 6, June 1955, page 1127.